United States Patent [19]

Elkins

[11] Patent Number: 5,054,228
[45] Date of Patent: Oct. 8, 1991

[54] POLECAT FISHING POLE HOLDER

[76] Inventor: Jack D. Elkins, Rte. 2, Box 272, Pickel Farm Rd., Kingston, Tenn. 37763

[21] Appl. No.: 567,639

[22] Filed: Aug. 15, 1990

[51] Int. Cl.$^5$ ............................................ A01K 97/10
[52] U.S. Cl. ..................................... 43/21.2; 43/54.1
[58] Field of Search ............... 43/21.2, 54.1; 248/538, 248/520, 512, 511

[56] References Cited

U.S. PATENT DOCUMENTS

| | | | |
|---|---|---|---|
| 2,153,549 | 4/1939 | Cooper | 43/54.1 |
| 3,603,019 | 9/1971 | Smeltzer | 43/21.2 |
| 4,014,128 | 3/1977 | Hrdlicka | 43/21.2 |
| 4,845,881 | 7/1989 | Ward | 43/21.2 |

Primary Examiner—Richard K. Seidel
Assistant Examiner—Patty E. Hong
Attorney, Agent, or Firm—Pitts and Brittian

[57] ABSTRACT

A fishing pole holder (10) for securing a plurality of fishing pole handles (46) such as in fishing tournaments and for storing peripheral fishing equipment at a close proximity to the fishing pole handles (46). A plurality of pole handle receptacles (26) are dimensioned for snugly receiving fishing pole handles (46) to allow the fisherman to readily store or retrieve fishing poles for a speedy change of baits. A base (12) has an extended section which acts as a cantilever and couples with the mass of a housing (14) to overcome moments created by fishing poles while engaged by the fishing pole holder (10). The housing (14) carries the pole handle receptacles (26) and is connected to at least a portion of the base (12).

19 Claims, 3 Drawing Sheets

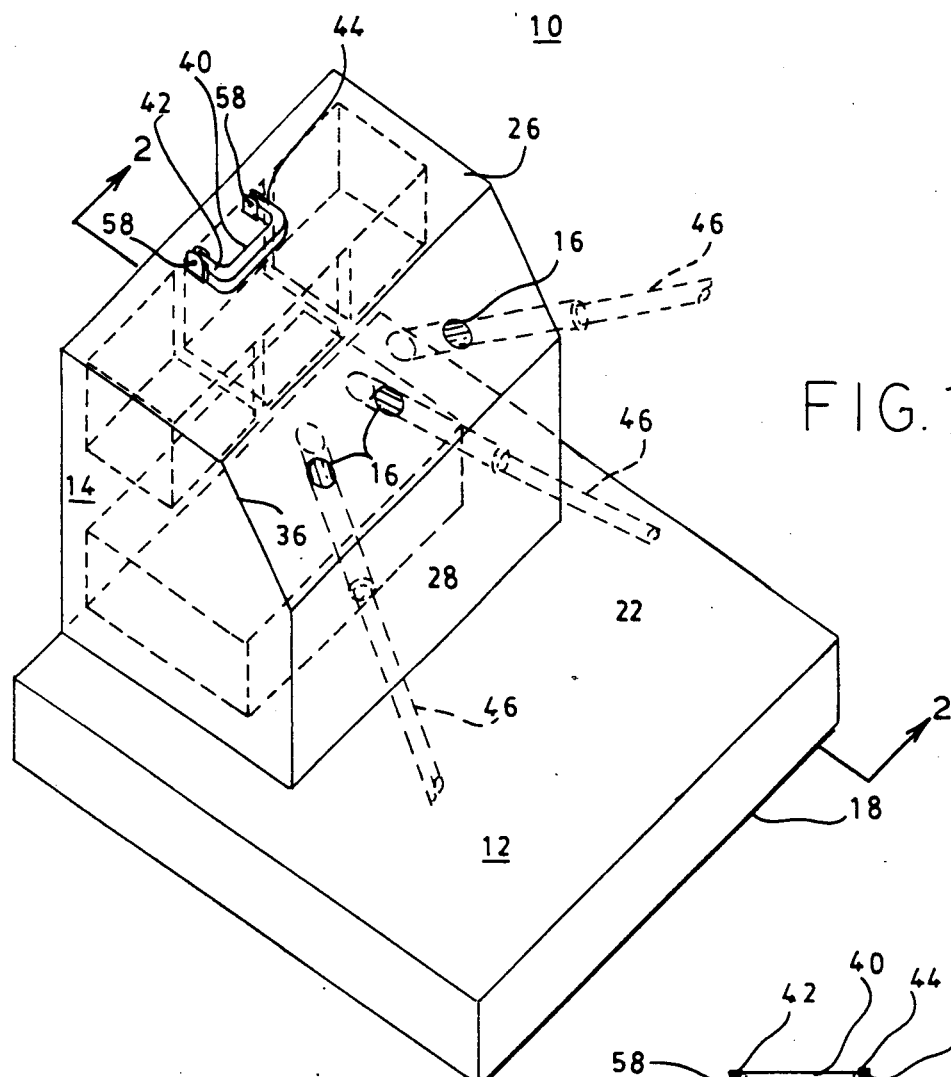
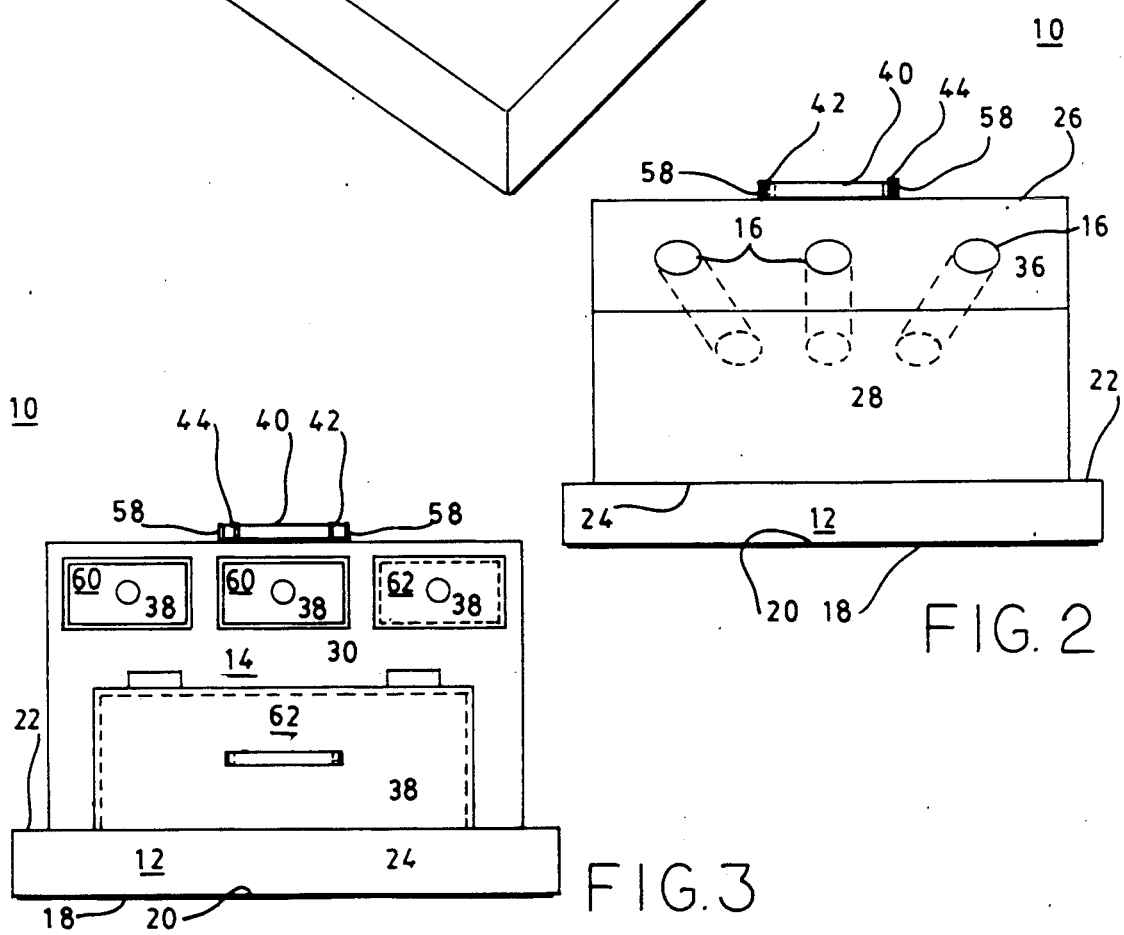
FIG. 1
FIG. 2
FIG. 3

POLECAT FISHING POLE HOLDER

TECHNICAL FIELD

This invention relates to the field of fishing, and more specifically relates to a holding device for a plurality of fishing poles for storage or fishing.

BACKGROUND ART

In the sport of fishing, it is known that the effectiveness of a bait is dependent on many factors, including but not limited to the time of day, the time of year, the location of the fishing source, the location within the fishing source, the temperature of the air, and the temperature of the water. These varying conditions often make the bait selection process difficult, causing a user to change bait selections during the course of a fishing session, thus taking valuable time away from fishing. It is also known that in order to facilitate such change, or to re-bait a line which has lost its bait, peripheral equipment is required. It is also known that other equipment is employed to enhance the fish-catching capability, including fish-finders, and battery chargers for battery-operated equipment. The use of such equipment requires some means of storage, normally that storage being separate from the fishing poles. Thus, the retrieval of such equipment decreases the actual time allotted for fishing to an even greater extent. In a fishing tournament, such as for bass or crappie, where time is of the essence, such delays may be costly to the entrants.

Therefore, it is an object of this invention to provide a means for holding a plurality of fishing poles, each pole being baited as desired such that the time required to change baits or to re-bait a hook will be minimized.

It is also an object of this invention to allow the user to cast any number of the baited fishing lines as the user requires.

Another object of this invention is to provide a means for holding a plurality of accessories preferably in the back of the device, including but not limited to hooks, lures, weights, floats, fish finders, and battery chargers, such that the retrieval of such accessories is minimized due to their proximity to the fishing poles.

Yet another object of this invention is to provide a feature such that the device will not tilt or overturn when it serves to store poles at an acute angle from the support surface or in a substantially upright manner.

Still another object of this invention is to provide a handle to facilitate carrying the device as it is being transported.

DISCLOSURE OF THE INVENTION

Other objects and advantages will be accomplished by the present invention which serves to secure and store a plurality of fishing poles. The fishing pole holder of the present invention includes a base which is fabricated from a durable material such as wood. The base includes an extended section which enhances the stability of the device when poles are stored therein at an acute angle from the support surface or in a substantially upright manner. This extended section acts as a cantilever against the tilting forces of the poles. A housing is connected to and supported by at least a portion of the base and includes a selected mass to assist in preventing tilt. The housing includes in a preferred embodiment at least one receptacle for storage of peripheral fishing equipment, and at least one receptacle to secure fishing pole handles at a preselected position.

In the preferred embodiment, at least one fishing pole handle receptacle comprises a hole opening on the front face of the invention, and is dimensioned to permit the fishing pole handle to be closely received at a preselected angle. In one embodiment each storage receptacle is dimensioned to closely receive a drawer that may be selectively opened and closed to retrieve or deposit contents such as lures. In another embodiment, each storage receptacle is provided with a door hingeably attached to the back face of the housing means such that the opening of the storage receptacle remains covered. In another embodiment, a storage receptacle is dimensioned to receive the components of a battery charger and is provided with a cover plate to cover the opening and protect the battery charger components. A base liner is connected to the bottom face of the base to prevent slippage of the device along the support surface such as the body of the boat. In order to facilitate the user while transporting the device, the housing has a handle incorporated in it proximate its top or rear face. In one embodiment, the fishing pole holder is incorporated into the fishing deck of a boat. In that embodiment the fishing pole holder is connected to a portion of the fishing deck using a hinge so that the fishing pole holder may be selectively deployed for use or retracted for storage.

BRIEF DESCRIPTION OF THE DRAWINGS

The above mentioned features of the invention will become more clearly understood from the following detailed description of the invention read together with the drawings in which:

FIG. 1 is a perspective view of the fishing pole holder constructed in accordance with the features of the present invention as it is used to secure and store fishing poles shown in phantom;

FIG. 2 is the front view of the fishing pole holder shown in FIG. 1;

FIG. 3 is the back view of the fishing pole holder shown in FIG. 1 showing the storage receptacles engaging sliding drawers and hingeably attached doors;

BEST MODE FOR CARRYING OUT THE INVENTION

Figure 4:
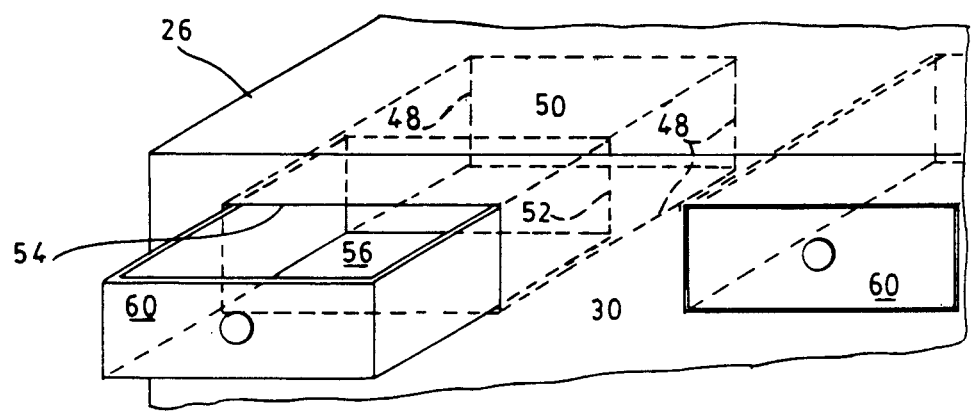
FIG. 4 illustrates a perspective view of a portion of the holder shown in FIG. 3 showing a typical storage receptacle opening on the back of the holder, the storage receptacle engaging a sliding drawer.
Figure 5:
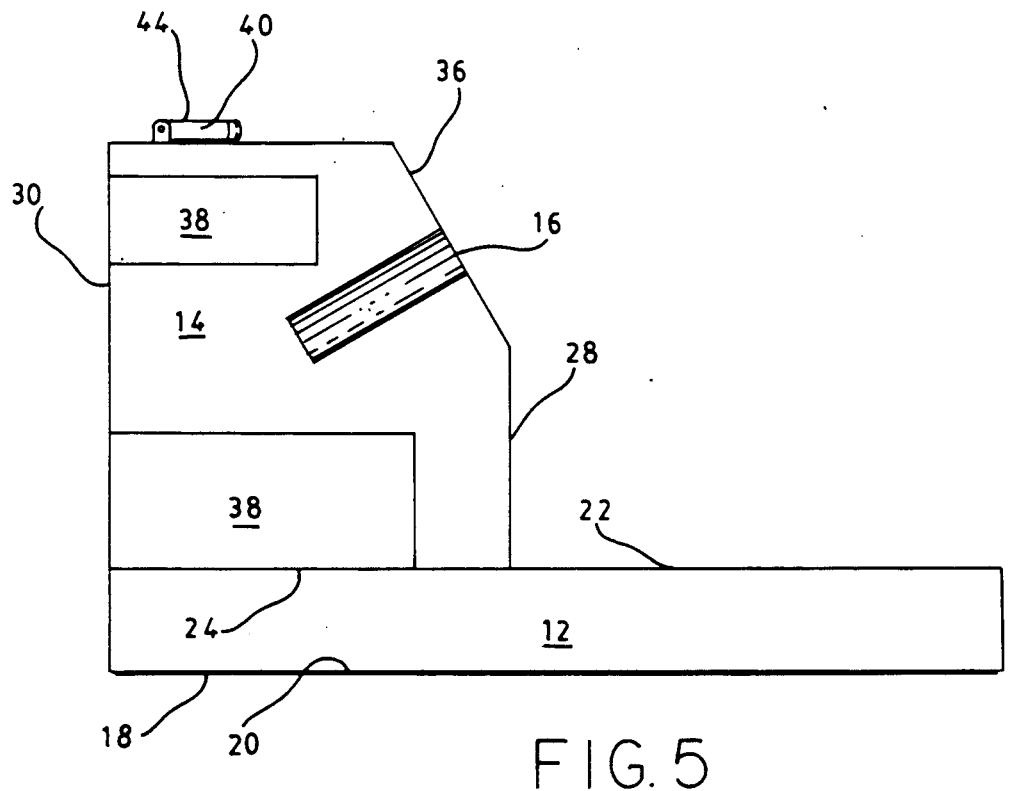
FIG. 5 illustrates a sectional view of FIG. 1 along lines 2—2.

A fishing pole holder incorporating various features of the present invention is illustrated generally at 10 in the figures. The holder 10 is designed for securing a plurality of fishing pole handles 46 at a selected angle. Moreover, in the preferred embodiment the holder 10 is designed to store peripheral fishing equipment such as lures, hooks, and/or battery chargers.

The fishing pole holder 10 includes a base means 12 which is dimensioned such that the fishing pole holder 10 is stable when employed. The bottom face 20 of the base means 12 is attached to a slippage prevention means 18 such that the device will not slip along a support surface such as the fishing deck 80 of a boat 78. In the preferred embodiment, the base means 12 is fabricated from wood, plastic or the like. The base means 12 includes an extended section which acts as a cantilever to counterbalance the tilting forces applied to the device when poles are stored therein.

A housing 14 is attached to at least a portion of the base means 12, the housing bottom face 24 contacting the top face 22 of the base means 12. In the preferred embodiment, the housing 14 is defined by a substantially cubical shape with an angled face 36 being substantially parallel to the intersection of two planes on which the front face 28 and top face 26 respectively lie, and intersecting the front face 28 and top face 26. The housing 14 is fabricated with a selected mass to assist in preventing tilt. In the preferred embodiment, the housing 14 is fabricated from wood.

The housing 14 includes a pole handle engaging means 16 defined by a plurality of recesses opening on the angled face 36 of the housing 14 at a substantially perpendicular angle. These recesses have a diameter such that a fishing pole handle may be snugly received therein, as shown in FIG. 1, so that the fishing pole handle 46 does not substantially move with respect to the fishing pole holder 10. Each pole handle engaging means 16 is dimensioned at a sufficient depth to secure the engaged fishing pole handle 46.

Figure 6:
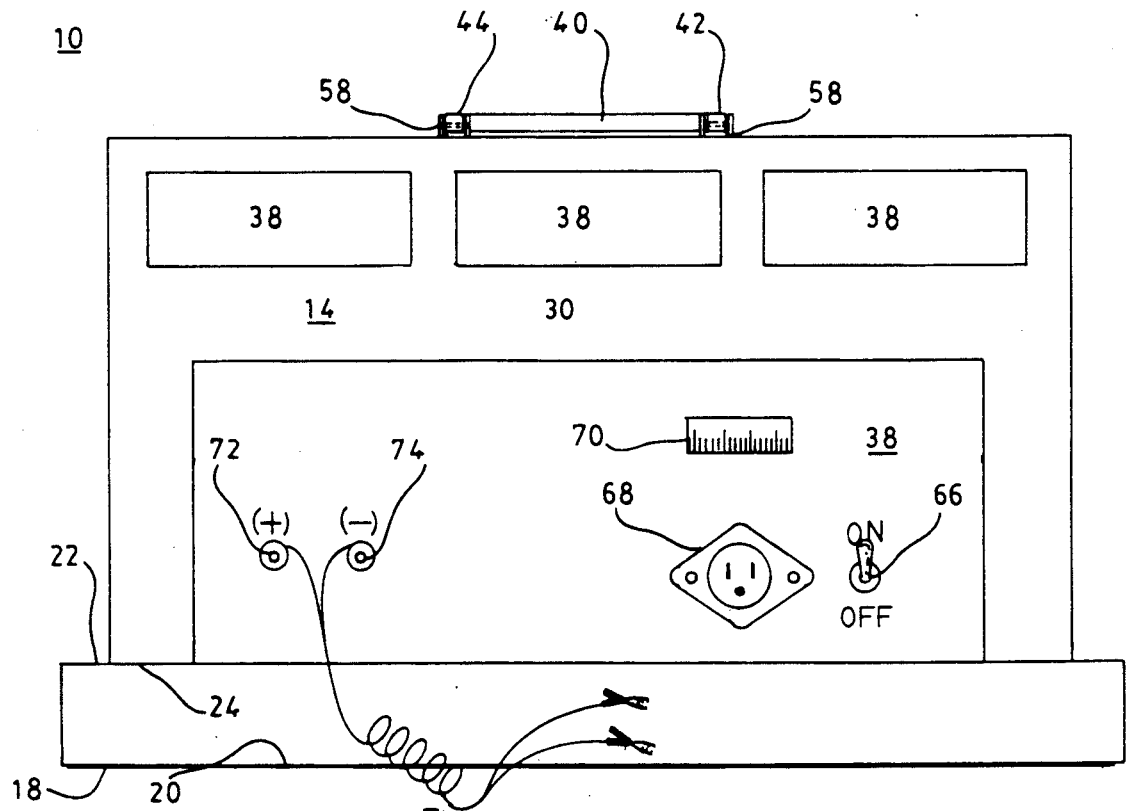
FIG. 6 illustrates the back view of the fishing pole holder shown in FIG. 1 showing the storage receptacles engaging a battery charger.

In order to store lures, hooks, and other fishing accessories, receptacles are provided in the housing of the preferred embodiment. Those storage receptacles 38 are each defined as a recess in the housing means 14, opening on the back face 30. The walls 48, top 50, and bottom 52 of the storage receptacles 38 define an opening 54 and an interior volume 56 as shown in FIG. 4. In the preferred embodiment, the individual storage receptacles 38 are dimensioned such that peripheral fishing equipment of different sizes may be received within. In one embodiment each storage receptacle 38 is dimensioned to closely receive a drawer 60, as shown in FIG. 3 and FIG. 4 which can be selectively opened and closed. In an alternate embodiment, each storage receptacle 38 is provided with a door 62, as shown in FIG. 3, hingeably attached to the back face of the housing means 14 such that the opening of the storage receptacle 38 remains covered. In another embodiment, as shown in FIG. 6, a storage receptacle 38 is dimensioned to receive battery charger components including an on/-off toggle switch 66, a grounded male electrical cord receptacle 68, an amp meter 70, a positive battery cable post 72, and a negative battery cable post 74. It will be noted that in this embodiment the battery charger components may vary as the user requires.

The housing 14 includes a handle 40 proximate its top face, as shown in FIG. 1, for being engaged by the user's hand while transporting the fishing pole holder 10. In the preferred embodiment, the handle 40 is substantially U-shaped with first and second end portions 42 and 44 pivotally attached to the housing means 14. Hinge pins 58 are provided to pivotally attach the handle 40 to the housing means 14 in a conventional fashion.

Figure 7:
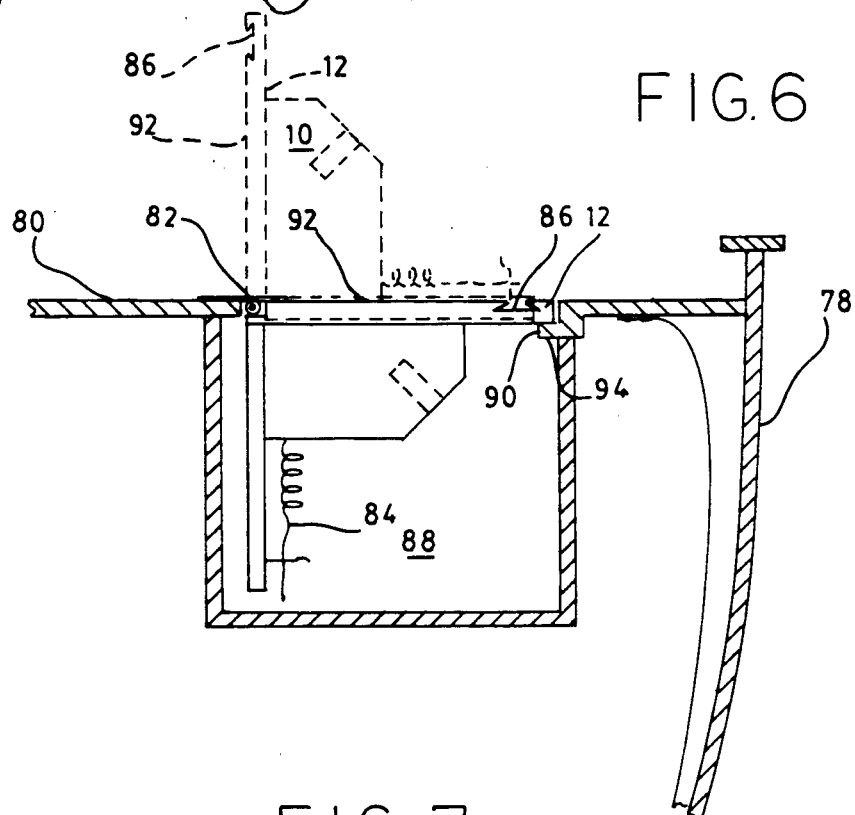
FIG. 7 illustrates a portion of a boat, in cross section, showing the fishing pole holder of FIG. 1 connected to the fishing deck, the fishing pole holder shown in the stored position and in the deployed position in phantom.

In an alternate embodiment, as shown in FIG. 7, the fishing pole holder 10 is hingeably connected to the fishing deck 80 of the boat 78. In this embodiment, the boat 78 includes a recess 88 defining an opening 90 on the fishing deck 80 dimensioned to receive the fishing pole holder 10 when stored. A fishing deck plate 92 is dimensioned to be closely received by the opening 90 and is connected to the fishing deck 80 with a hinge 82 such that the fishing deck plate 92 may be pivoted about one side. The fishing deck 80 includes a lip 94 dimensioned to support the fishing deck plate 92 when the fishing deck plate 92 is in the closed position. In this embodiment the fishing pole holder 10 is connected to at least a portion of the fishing deck plate 92 such that when the fishing deck plate 92 is in the closed position, the fishing pole holder 10 is retracted for storage and when the fishing deck plate 92 is in a substantially vertical position, the fishing pole holder 10 is deployed for use. In the preferred embodiment, a pin 84 is used to fix the base 12 to the fishing deck 80 to prevent the fishing pole holder 10 from moving substantially in relation to the fishing deck 80 while the fishing pole holder 10 is deployed. In the preferred embodiment, the fishing deck 80 includes a handle 86 which is used to lift the fishing pole holder 10 from the stored position to the deployed position.

From the foregoing detailed description, it will be recognized that an improved holder for storing fishing poles has been provided. The holder of the present invention serves to store and secure poles in a manner such that they can be readily retrieved by a fisherman desiring to rapidly change bait. The holder of the present invention also serves to receive fishing poles in such a manner as to allow the fisherman to quickly release the fishing pole and return to other tasks. Moreover the holder of the present invention is designed such that the base extends forward to act as a cantilever and couples with the mass of the housing to overcome the moment due to fishing poles in the stored position, which enables the holder to be freestanding and allows the fisherman the ability to relocate the holder as the he requires, such as up and down the length of a boat.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A fishing pole holder comprising:
 a base means for engaging a supporting surface, said base means including an extended section to act as a cantilever to counterbalance the tilting forces of the poles;
 a housing means connected to and supported by at least a portion of said base means, said housing means including a selected mass to assist in preventing tilt; and
 a pole handle engaging means carried by said housing means for holding at least one pole at a selected position in a first direction.

2. The fishing pole holder of claim 1 wherein said base means is fabricated of a durable material.

3. The fishing pole holder of claim 2 wherein said durable material is wood.

4. The fishing pole holder of claim 1 which further comprises a slippage prevention means permanently affixed to a substantial portion of said base means to prevent slippage of said base means along said support surface.

5. The fishing pole holder of claim 1 wherein said pole engaging means includes at least one receptacle for securing the handle portion of at least one fishing pole.

6. A fishing pole holder comprising:
- a base means for engaging a supporting surface which is fabricated of wood, said base means including an extended section to act as a cantilever to counterbalance the tilting forces of the poles, said extended section extending in a first direction;
- a housing means connected to and supported by at least a portion of said base means, said housing means including a selected mass to assist in preventing tilt;
- a pole handle engaging means carried by said housing means for holding at least one pole at a selected position in a direction away from said housing substantially equal to said first direction of said base means extended section, said pole handle engaging means being recessed into said housing means such that said pole handle engaging means opens on a face of said housing means, and said pole handle engaging means being positioned proximate the center of said selected mass of said housing to reduce tilting moments; and
- a slippage prevention means permanently affixed to a substantial portion of said base means to prevent slippage of said base means along said support surface.

7. The fishing pole holder of claim 6 wherein said housing means further includes at least one receptacle for the separate storage of apparatus used in connection with fishing.

8. A fishing pole holder comprising:
- a base means for engaging a supporting surface which is fabricated of wood, said base means including an extended section which acts as a cantilever to counterbalance the tilting forces of the poles said extending section extending in a first direction;
- a housing means connected to and supported by at least a portion of said base means, said housing means including a selected mass to assist in preventing tilt and at least one receptacle for the separate storage of apparatus used in connection with fishing;
- a pole handle engaging means carried by said housing means for holding at least one pole at a selected position in a direction away from said housing substantially equal to said first direction of said base means extended section, said pole handle engaging means being recessed into said housing means such that said pole handle engaging means opens on a face of said housing means, and said pole handle engaging means being positioned proximate the center of said selected mass of said housing to reduce tilting moments;
- a slippage prevention means permanently affixed to a substantial portion of said base means to prevent slippage of said base means along said support surface; and
- at least one receptacle for the separate storage of apparatus used in connection with fishing.

9. The fishing pole holder of claim 8 further comprising a carrying means connected to said housing means used to support the weight of said fishing pole holder when lifted from said supporting surface.

10. The fishing pole holder of claim 1 wherein said base means extended section extends away from said housing in a direction substantially equal to said first direction of said poles.

11. The fishing pole holder of claim 1 wherein said pole handle engaging means is recessed into said housing means such that said pole handle engaging means opens on a face of said housing means.

12. The fishing pole holder of claim 1 wherein said pole handle engaging means is positioned proximate the center of said selected mass of said housing to reduce tilting moments.

13. The fishing pole holder of claim 7 wherein at least one of said receptacles is provided with a drawer for the separate storage of fishing apparatus.

14. The fishing pole holder of claim 7 wherein at least one of said receptacles is provided with a door for the closure of said receptacle thus providing for the separate storage of fishing apparatus.

15. The fishing pole holder of claim 7 wherein a battery charger is carried by one of said receptacles provided for the separate storage of fishing apparatus.

16. The fishing pole holder of claim 8 wherein at least one of said receptacles is provided with a drawer for the separate storage of fishing apparatus.

17. The fishing pole holder of claim 8 wherein at least one of said receptacles is provided with a door for the closure of said receptacle thus providing for the separate storage of fishing apparatus.

18. The fishing pole holder of claim 8 wherein a battery charger is carried by one of said receptacles provided for the separate storage of fishing apparatus.

19. The fishing pole holder of claim 8 wherein said fishing pole holder is connected to a fishing deck of a boat such that said fishing pole holder may be selectively deployed for use and retracted for storage.

* * * * *